United States Patent [19]

Jenny

[11] 3,845,919
[45] Nov. 5, 1974

[54] LANDING GEAR TRUCK PITCH DAMPING
[75] Inventor: Robert W. Jenny, Bellevue, Wash.
[73] Assignee: The Boeing Company, Seattle, Wash.
[22] Filed: Jan. 7, 1974
[21] Appl. No.: 431,189

[52] U.S. Cl. ............................. 244/103 R, 188/129
[51] Int. Cl. .......................................... B64c 25/36
[58] Field of Search ........ 244/100 R, 102 R, 103 R, 244/104 R, 104 FP, 111, 50; 280/81 R, 124 F; 188/129

[56] References Cited
UNITED STATES PATENTS

| | | | |
|---|---|---|---|
| 2,792,998 | 5/1957 | Dowty | 244/111 |
| 2,904,136 | 9/1959 | Greenough | 244/111 |
| 2,943,820 | 7/1960 | Westcott, Jr. | 244/50 |
| 3,027,123 | 3/1962 | Westcott, Jr. | 244/111 |
| 3,059,916 | 10/1962 | Fahlbusch et al. | 188/129 |
| 3,322,376 | 5/1967 | Neilson et al. | 244/102 R |
| 3,807,668 | 4/1974 | Whitener | 244/104 R |

FOREIGN PATENTS OR APPLICATIONS 664,548  1/1952  Great Britain ................. 244/111

Primary Examiner—Trygve M. Blix
Assistant Examiner—Galen L. Barefoot
Attorney, Agent, or Firm—B. A. Donahue; Glenn Orlob

[57] ABSTRACT

A device for damping the post-landing angular oscillations of the bogie or axle beam on a multi-wheel bogie-type aircraft landing gear. The device employs a sensor for sensing rotational motion of the bogie about its pivotal mount on the landing gear shock strut and supplying a hydraulic pressure proportional to any such rotation to a frictional braking mechanism which acts to damp out the motion.

14 Claims, 8 Drawing Figures

PATENTED NOV 5 1974

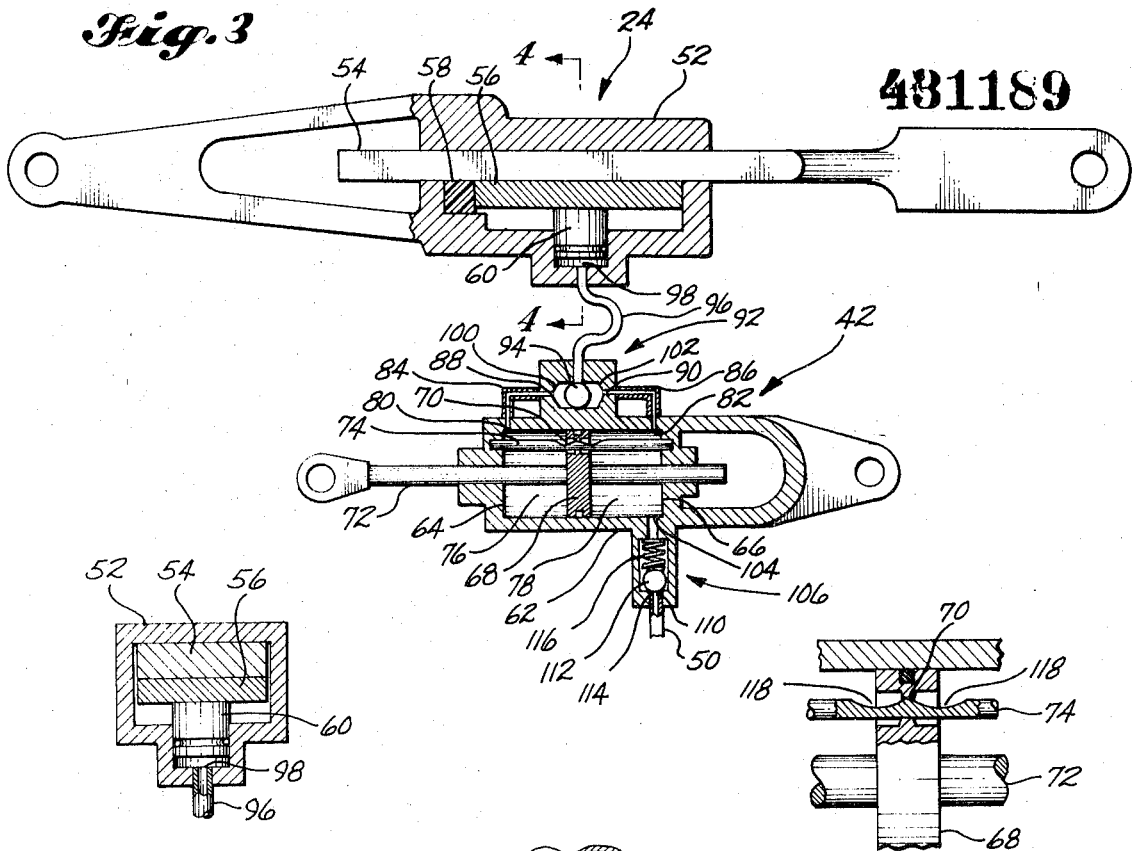
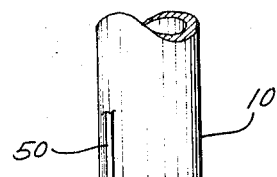
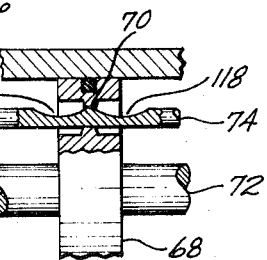
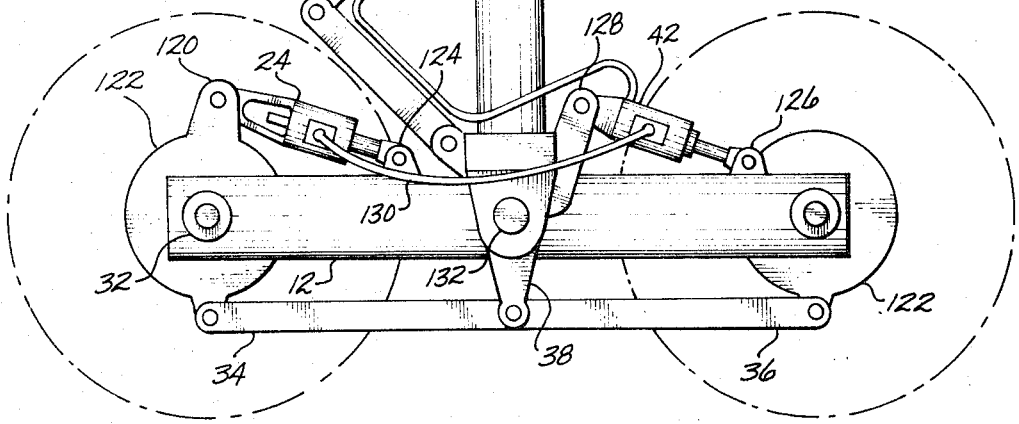

3,845,919

LANDING GEAR TRUCK PITCH DAMPING

BACKGROUND OF THE INVENTION

This invention relates to aircraft landing gear systems, and more particularly, to a device for damping out the post-landing angular oscillations of the bogie or axle beam in a truck-type, multiwheel aircraft landing gear induced by landing impact and braking. Such damping is desirable because these oscillations interfere with the proper operation of anti-skid braking systems and cause undesirable vibrations in the landing gear structure.

On larger aircraft, the main landing gears commonly incorporate a "four-wheel truck" which provides for the mounting of four wheels and associated brakes on each shock absorbing strut. The wheels are mounted on a beam which is pivotally mounted to the shock strut midway between the fore and aft axles of the truck to divide the load equally between the fore and aft wheels. There are two well known problems with this type of gear. First, application of the brakes causes torques which load the forward wheels more heavily than the aft and tend to make the beam pitch downward in front and upward in the rear. Second, pitching of the truck can occur due to landing impact on the wheels if the aircraft lands with the rear set of wheels lower than the front set, or vice versa.

In truck pitching, the mass of the truck oscillates in a rotary motion about the pivot point, and the tires function as springs in the spring/mass system. Undesirable effects of this pitching include structural vibration, and, more important, interference with efficient braking, particularly under poor conditions when good braking is most needed. Problems with braking are aggravated in aircraft using highly sensitive anti-skid systems. Such systems measure angular accelerations of the wheels, but truck pitching produces accelerations which in no way relate to braking. Hence, the system may become confused and, in some instances, complete loss of braking can result.

One way to avoid the first problem is mount the wheel brakes to rotate freely on the axles but to restrain them from rotating with respect to the strut by attaching them directly to the shock strut with links. When the resulting four bar linkage (truck beam, brake link, brake assembly and strut segment) forms a parallelogram, the brake torque is "grounded" to the strut and bypasses the truck itself.

A method commonly used to minimize truck pitching is to introduce hydraulic pumping devices into the spring/mass system. British Patent No. 664,548 to George Orloff, entitled "Improvements in or Relating to Bogie Undercarriages for Aircraft," dated Jan. 9, 1952, shows hydraulic means applied to damp pitching oscillation of the bogie, as well as to prevent overload of the front wheels due to braking.

U.S. Pat. No. 3,027,123, entitled "Brake Compensator for Tandem Landing Gears," issued on Mar. 27, 1962, to W. B. Westcott, Jr., utilizes hydraulic means to avoid an uneven load distribution between fore and aft wheels and adapts the means to damp pitching oscillations of the bogie beam.

Recent experience has shown, however, that with larger, heavier aircraft, the energy involved in truck pitching is so high that hydraulic means are essentially ineffective to satisfactorily minimize truck pitching. This is particularly true when the gear geometry does not permit large moment arms through which the hydraulic unit can act about the pitch axis, and when highly sensitive anti-skid systems are used.

Considering the background of this invention and the previous attempts to solve the inherent problems, a more powerful, compact means to damp truck pitching is clearly needed. It is well known in the art that aircraft brakes and automotive wheel brakes are among the most efficient dissipators of energy known in terms of foot-pounds of energy dissipated per pound of mechanism. It is also well known that a hydraulic shock absorber, while not so efficient, provides desirable characteristics for damping vibration.

SUMMARY OF THE INVENTION

A primary objective of this invention is to combine the desirable damping characteristics of a hydraulic shock absorber with a light, compact means of dissipating energy by friction.

A further objective is to produce a device that shall be readily adaptable to damping the motion of a four-wheel landing gear bogie relative to its shock strut.

A still further objective is that the amount of damping force generated by the device be controllable and that it can be varied as a function of the amount of angular rotation of the bogie.

In accordance with the objectives, the disclosed preferred embodiments involved devices which employ a means of sensing rotational motion of the bogie about its pivotal mount on the landing gear shock strut and supplying a hydraulic pressure proportional to any such rotation to a frictional braking mechanism which acts to damp out the motion.

BRIEF DESCRIPTION OF THE DRAWINGS

FIG. 3 is an isolated cross-section view of the damping means of FIG. 1.

FIG. 4 is a cross-section of the friction assembly of FIG. 3 taken at 4—4.

FIG. 5 is an expanded cross-section of the pressure generating means of FIG. 3.

FIG. 6 is a side elevation view of an alternate preferred embodiment of the invention.

DESCRIPTION OF THE PREFERRED EMBODIMENTS

Figure 1:
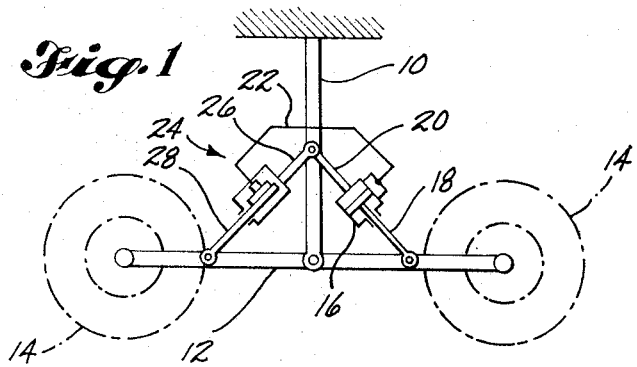
FIG. 1 is a side elevation view of a landing gear showing in schematic form the damping means of this invention.

In the schematic diagram of FIG. 1, an embodiment of this invention is shown installed on a typical multi-wheel aircraft landing gear assembly, which is composed of a vertical strut 10, and a horizontal axle beam 12 which is pivotally mounted near its midpoint to vertical strut 10 and having wheels and brake assemblies 14 rotably mounted on each end of the axle beam 12. As the axle beam 12 pivots about the vertical strut 10, sensing means 16 generates a varying hydraulic pressure. The sensing means 16 is pivotally mounted to the horizontal axle beam 12 by link 18 and to the vertical strut 10 by link 20. The hydraulic pressure is transmitted through a hydraulic line 22 to a frictional damping means comprising a frictional assembly 24 which is pivotally mounted to the vertical strut 10 by link 26 and to the axle beam 12 by link 28.

Figure 2:
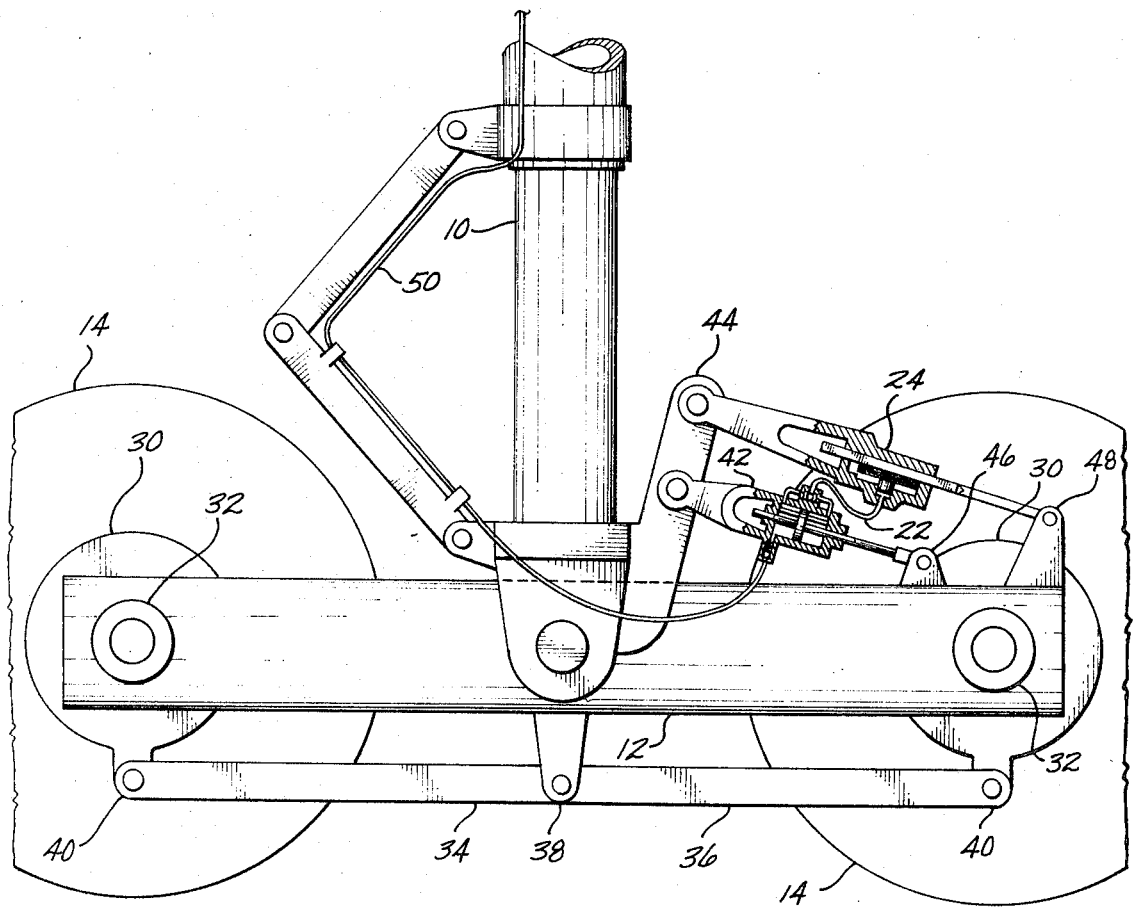
FIG. 2 is a side elevation view, partly in section, showing a preferred embodiment of this invention.

FIG. 2 shows a second embodiment of this invention. The wheels and brake assemblies on the near side have been omitted for clarity. The brake assemblies 30 are free to rotate on the axles 32 but are restrained from rotation with respect to the vertical strut 10 by links 34 and 36 pivotally mounted to an extension 38 of the vertical strut 10 and to lugs 40 located on each of the wheel brake assemblies 30.

The sensing means 16 of FIG. 1 in this embodiment is a double-acting hydraulic cylinder (or dashpot) and shuttle valve assembly 42 which is used to generate a varying hydraulic pressure. The assembly 42 is pivotally mounted on one end to an arm 44 attached to the vertical strut 10 and on the other end to a lug 46 attached to the axle beam 12. Hydraulic pressure is transmitted from assembly 42 through an interconnecting hydraulic line 22 to the friction assembly 24 which is mounted to arm 44 on one end and on the other end to lug 48 which is attached to the axle beam 12. Hydraulic fluid is supplied to assembly 42 by supply line 50.

FIG. 3 shows the friction assembly 24 and the double-acting hydraulic cylinder and shuttle valve assembly 42 in greater detail. The friction assembly 24 comprises a body 52, a slider 54, a brake pad 56 made of a frictional material, a resilient spacer 58, and a piston 60 operating in the cylindrical recess in the body 52. Dashpot assembly 42 includes a cylinder 62 with closed ends 64 and 66, a piston 68 having an orifice 70, a piston rod 72, and a metering rod 74. Piston 68 fits closely into the bore of the cylinder 62, and orifice 70 forms a passage through piston 68 connecting cavities 76 and 78. Ports 80 and 82 open into cavities 76 and 78, respectively, and are connected by lines 84 and 86 to ports 88 and 90, respectively, in shuttle valve assembly 92. The shuttle valve assembly 92 is connected by line 96 to port 98 in friction assembly 24. Ball 94 in shuttle valve assembly 92 will seat in either seat 100 or 102 thus preventing fluid flow into lines 84 or 86, respectively. Port 104 in cavity 78 connects with check valve assembly 106. Hydraulic fluid supply line 50 is connected to the inlet port 110 of the check valve assembly 106. Ball 112 is held against seat 114 by spring 116.

FIG. 4 shows a cross-sectional view of the friction assembly 24 of FIG. 3 taken at 4—4 and depicts the body element 52, the slider 54, the brake pad 56, the piston 60 and interconnecting line 96.

FIG. 5 shows a cross-section of the central portion of dashpot assembly 42. Metering rod 74, having recesses 118, working cooperatively with orifice 70 in piston 68 to vary the cross-sectional area of orifice 70 as the piston 68 travels through the cylinder 62. Metering rod 74 is fixedly supported in ends 64 and 66. Any leakage of hydraulic fluid in the system is replaced by fluid supplied from line 50 at any time that the pressure in the system is enough less than supply pressure to allow supply pressure to lift ball 112 off seat 114 against the force of spring 116.

Any tendency of the fluid in cavity 78 to escape through the supply line 50 is blocked by the check valve assembly 186.

Angular motion of the axle beam 12 of FIG. 2 with respect to the vertical strut 10 causes a motion of the piston 68 within the dashpot assembly 42 which results in fluid flow through orifice 70 and an increase in pressure in either cavity 76 or 78, whichever is decreasing in volume.

The pressure differential across piston 68 tends to cause flow through ports 88 and 90 in the shuttle valve assembly 92, but ball 94 moves against either seat 100 or 102 depending on flow direction and closes off the flow, directing the pressure increase through line 96 to piston 60. The pressure increase forces piston 60 against friction pad 56, which in turn is pressed against slider 54, which in turn slides on the inner surface of body 52. As a result, motion between the axle beam 12 and the strut 10 is impeded by the viscous damping forces in the dashpot assembly 42 and the friction forces in friction assembly 24.

The friction between slider 54 and friction pad 56 tends to cause friction pad 56 to move with slider 54 but it is restrained from motion in one direction by contact with body 52 and in the other direction by resilient spacer 58. The spacer 58 is under enough compression so that the force applied exceeds any force tending to move the friction pad 56 with slider 54; hence there is no backlash in the friction assembly 24. The resilience of spacer 58 also accommodate dimensional variations caused in manufacturing and by thermal effects.

The amount of damping force applied between the strut 10 and the axle beam 12 varies in amount as a function of several factors, including the viscosity of the fluid, the characteristics of orifice 70, the rates of motion, the areas of pistons 60 and 68, and the points on the axle beam 12 and vertical strut 10 at which the friction and dashpot assemblies are mounted. The influence of each factor is known to those of ordinary skill in the art and is determined by the details of the design.

FIG. 6 illustrates landing gear apparatus similar to that described in the embodiment of FIG. 2; with the exception that the friction assembly 24 is attached at one end to lug 120 on brake assembly 122 and at the other end to lug 124 on beam 12. Dashpot assembly 42 is attached to lug 126 on beam 12 and arm 128 on strut assembly 10. Fluid supply line 50 is connected to dashpot assembly 42, and line 130 connects dashpot assembly 42 to friction assembly 24.

In operation, friction assembly 24 of the FIG. 6 apparatus will tend to inhibit rotation of brake assembly 122 around axle 32. Beam 12, extension 38, link 34 and brake assembly 122 constitute a four-bar parallelogram linkage. The rotation of beam 12 about pivot 132 will cause brake assembly 122 to rotate about axle 32, and the damping force of friction assembly 24 is therefore effective to dampen motion of beam 12 about pivot 132.

Friction assemblies can be mounted on any or all of the brake assemblies, and can be supplied by one or more dashpot assemblies mounted in any way in which they are activated by the relative motion to be damped.

Figure 7:
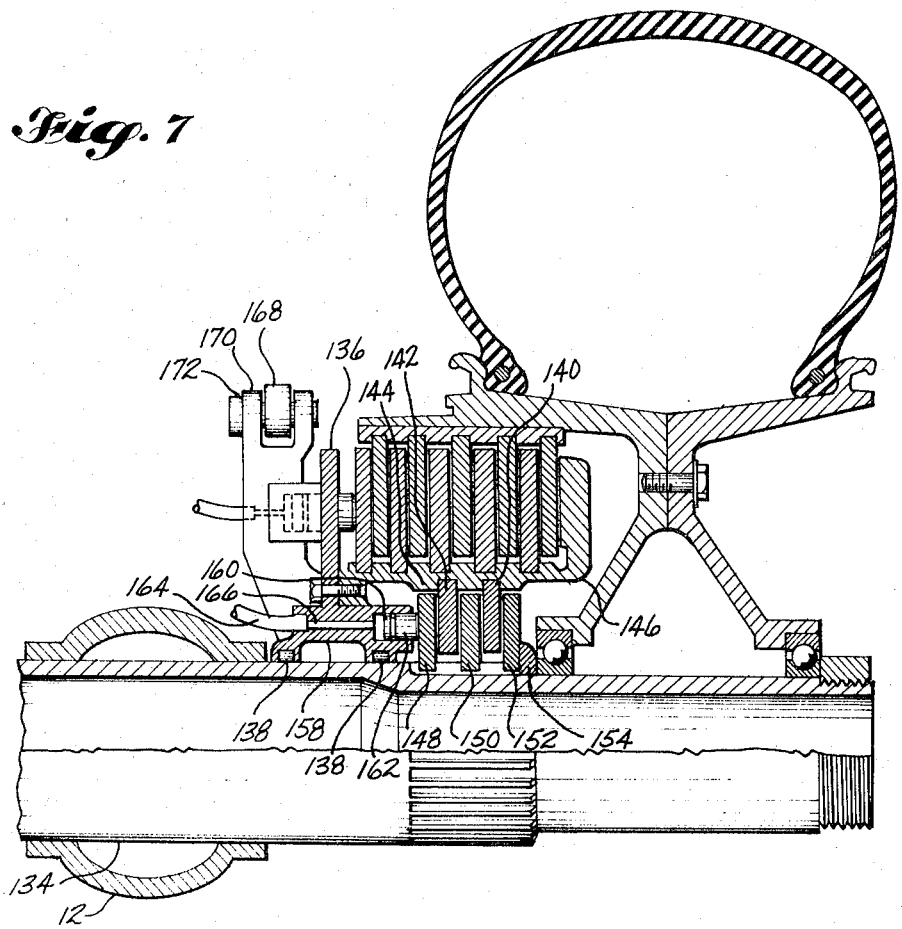
FIG. 7 shows in section a modified embodiment of the damping means of this invention.

FIG. 7 is a sectional view of a typical aircraft wheel brake assembly as conventionally used on four-wheel bogie landing gears, wherein motion between the brake assembly and axle is damped with a multi-disc clutch. Axle 134 is fixedly attached to axle beam 12, and wheel brake assembly 136 is rotatably mounted on axle 134 on bearings 138. Friction discs 140 and 142 engage splines 144 which are located on the inner diameter of torque tube 146. Friction discs 148, 150, and 152 and backing plate 154 engage splines 156 on axle 134. Brake assembly 158, which performs the same function as friction assembly 24 of FIG. 1, incorporates three cylinders 160 fitted with pistons 162 and spaced radially around the axle 134 to insure balanced application of force. Ports 164 and passages 166 conduct fluid from a dashpot assembly 42 (not shown) to cylinders 160.

The brake drum assembly 136 is prevented from rotating with respect to the vertical strut 10 (not shown) by link 168 which is pivotally mounted to lug 170 by pin 172.

In operation, pressure generated by dashpot assembly 42 will force piston 162 against friction disc 148, thus clamping the remaining discs 140, 142, 148, 150 and 152 together and against backing plate 154. The friction between adjacent discs, combined with the viscous damping effect of the dashpot, will act to damp rotational motion of beam 12.

Figure 8:
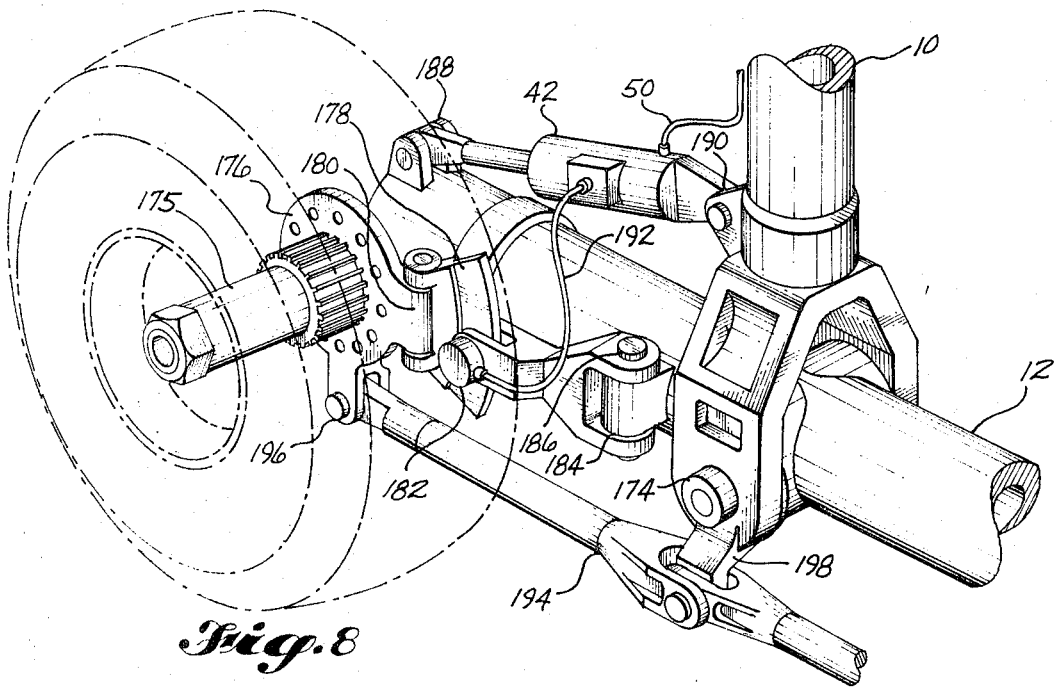
FIG. 8 is a perspective view of still another embodiment of this invention.

FIG. 8, illustrating yet another embodiment of this invention, shows only those elements of a four-wheel bogie landing gear necessary to the explanation of damping the motion of the axle beam on its pivot. Shown are the lower end of a vertical strut 10 with axle beam 12 pivoted to it at point 174. Axle 175 extends from axle beam 12 and brake torque tube assembly 176 is rotably mounted on it as shown and described in the embodiment of FIG. 7. Disc segment 178 is pivotally mounted to lug 180 on torque tube 176. A disc brake caliper assembly 182 as is commonly used for disc brakes on automobiles, fits over disc segment 178 and is pivotally mounted on lug 184 on axle beam 12 by pivot pin 186. Dashpot assembly 42 is pivoted to lug 188 on axle beam 12 and lug 190 on strut 10. Line 192 transmits pressure generated in dashpot assembly 42 to brake caliper assembly 182 and line 50 supplies hydraulic fluid to dashpot assembly 42. Brake torque tube 176 is restrained from free rotation by link 194 which is pivotally attached to it at lug 196 and to the strut 10 at extension 198.

In operation hydraulic pressure from the dashpot assembly 42, generated when the axle beam 12 rotates about pivot 174, is transmitted to the caliper assembly 182 which clamps onto disc segment 178, thus inhibiting rotation of the brake torque tube 176 due to rotation of the axle beam 12 about pivot 174. The viscous forces in the dashpot 42 also provide a damping effect. Disc brake damping assemblies as described above may be applied at any or all of the wheel brake assemblies on a four-wheel truck.

While several preferred forms of this invention have been described, other and obvious modifications and variations are possible in light of the disclosures made herein. Therefore, this invention should be considered to be limited only by the scope of the appended claims.

What is claimed is:

1. A frictional damping device for use with a bogie or truck-type aircraft landing gear having a vertically extending strut, a horizontally extending axle beam pivoted about the lower end of said strut, and wheels rotatably mounted on axles located on said axle beam; comprising in combination:

sensing means for sensing relative angular motion between said vertical strut and horizontal axle beam; and frictional damping means responsive to said sensing means to damp the relative angular motion by use of frictional force.

2. The apparatus of claim 1 which includes a wheel brake assembly for producing a braking torque resisting rotation of said wheels, said brake assembly being rotably mounted on said axle and is restrained from rotation with respect to the vertical strut.

3. The apparatus of claim 1 wherein said sensing means comprises means for producing a varying hydraulic pressure proportional to said relative angular motion.

4. The apparatus of claim 3 wherein said means for producing a varying hydraulic pressure comprises:

a double acting hydraulic cylinder and piston assembly pivotally connected on one end to the strut and on the other to the axle beam, said piston having an orifice permitting the passage of hydraulic fluid from one side of the piston to the other, a shuttle valve connected to cavities formed within the hydraulic cylinder on either side of the piston so that a positive pressure is transmitted from the shuttle valve when the piston moves in either direction in the cylinder.

5. The apparatus of claim 3 wherein said frictional damping means comprises a friction assembly pivotally connected on one end to the strut and on the other end to the axle beam, said friction assembly comprising:

a body element;

a slider member;

a hydraulic cylinder-and-piston assembly responsive to said means for producing varying hydraulic pressure;

a brake pad or shoe made of a frictional material; and means for transmitting hydraulic pressure to said hydraulic cylinder, such that hydraulic pressure produced by said means for generating hydraulic pressure when there is relative angular motion between the strut and the axle beam is transmitted to the hydraulic cylinder and acts upon the piston, causing the piston to press upon the brake shoe which in turn presses upon the slider member, thereby generating a frictional force which tends to retard the motion of the slider and damp the relative angular motion between the strut and the axle beam.

6. The apparatus of claim 2 wherein said friction damping means is pivotally connected between the axle beam and the wheel brake assembly.

7. The apparatus of claim 2 wherein said frictional damping means comprises in combination:

a set of multiple braking discs some of which are splined to the axle and the remainder of which are splined to one of the wheel brake assemblies, said discs being so arranged that each disc splined to the axle is adjacent to a disc splined to the wheel brake assembly;

said sensing means comprising means for producing a varying hydraulic pressure proportional to relative angular motion between the strut and the axle beam;

a hydraulic cylinder and piston arranged such that an increase in hydraulic pressure within the cylinder causes the piston to compress the multiple braking discs; and means for transmitting said hydraulic pressure from said means for producing to said hydraulic cylinder, such that angular motion between the strut and the axle beam results in a compression of the braking discs producing frictional resistance to the rotation of the brake assembly about the axle, and consequently, a damping of the rotation of the axle beam about its pivot on the strut.

8. The apparatus of claim 2 wherein said frictional damping means comprises in combination:

a segment of a disc mounted to said wheel brake assembly, the axis of said segment being parallel to the axis of rotation of said wheel brake assembly;

a disc brake caliper assembly of the type used for automobile braking, attached to said axle beam and positioned so that it applies braking force to the disc segment;

said sensing means for producing a varying hydraulic pressure proportional to relative angular motion between the strut and the axle beam; and means to transmit said pressure to the disc brake caliper assembly, such that a relative angular motion between the axle beam and the strut causes a frictional force to be applied to the disc segment, thus providing resistance to the rotation of the wheel brake assembly about the axle, and consequently, a damping of the rotation of the axle beam about its pivot on the strut.

9. A multi-wheel aircraft landing gear comprising:
a vertical strut;
a horizontal axle beam pivotally mounted with respect to said strut;
a plurality of wheels rotably mounted on said beam;

means for sensing relative angular motion between said strut and said beam and for generating a hydraulic pressure proportional thereto;
damping means responsive to said hydraulic pressure for creating a sliding friction force resisting said relative angular motion between said strut and said beam.

10. The landing gear of claim 9 wherein said damping means comprises two adjacent relatively movable members having contact surfaces and wherein said hydraulic pressure acts to create a friction force.

11. The landing gear of claim 10 wherein one of said contact surfaces is carried by a piston member actuated by said hydraulic pressure.

12. The landing gear of claim 11 wherein said means for generating hydraulic pressure comprises a hydraulic cylinder and piston assembly connected between said strut and said beam.

13. The landing gear of claim 9 which additionally includes brake means rotably mounted on said beam and means for preventing rotational motion of said brake means with respect to said strut.

14. The landing gear of claim 13 wherein said damping means is connected between said beam and said brake means and said means for generating hydraulic pressure is connected between said strut and said beam.

* * * * *